F. M. BEST.
SHOCK ABSORBER FOR MOTOR CARS AND OTHER VEHICLES.
APPLICATION FILED JULY 23, 1915.

1,199,658.
Patented Sept. 26, 1916.
2 SHEETS—SHEET 1.

INVENTOR
Francis Mayfield Best
BY
ATTORNEYS

F. M. BEST.
SHOCK ABSORBER FOR MOTOR CARS AND OTHER VEHICLES.
APPLICATION FILED JULY 23, 1915.

1,199,658.

Patented Sept. 26, 1916.
2 SHEETS—SHEET 2.

INVENTOR
Francis Mayfield Best
BY
ATTORNEYS

UNITED STATES PATENT OFFICE.

FRANCIS MAYFIELD BEST, OF YARRA GLEN, VIA MORGAN, SOUTH AUSTRALIA, AUSTRALIA.

SHOCK-ABSORBER FOR MOTOR-CARS AND OTHER VEHICLES.

1,199,658.  Specification of Letters Patent.  Patented Sept. 26, 1916.

Application filed July 23, 1915. Serial No. 41,502.

*To all whom it may concern:*

Be it known that I, FRANCIS MAYFIELD BEST, a subject of the King of Great Britain and Ireland, residing at Yarra Glen, via Morgan, State of South Australia, Commonwealth of Australia, have invented a certain new and useful Improved Shock-Absorber for Motor-Cars and other Vehicles, of which the following is a specification.

This invention relates to a very simple and easily fitted device for taking up or absorbing the shocks that would otherwise be imparted to motor cars and other vehicles when traveling over rough roads.

In my invention the shock is taken up by a spiral spring device, the shock being transmitted to the spring device by a flexible connection or connections passing around a pulley or pulleys, one end of each flexible connection being attached to the spring device and the other end to a bracket, the bracket being attached to the body or frame of the vehicle and the pulley to the axle of same, or vice versa the bracket being attached to the axle and the pulley to the body or frame. The bracket may be either a rigid construction or a leaf spring.

In order that my invention may be clearly understood I will describe the same with reference to the accompanying drawings which are all somewhat diagrammatic and in which:—

Figure 1:
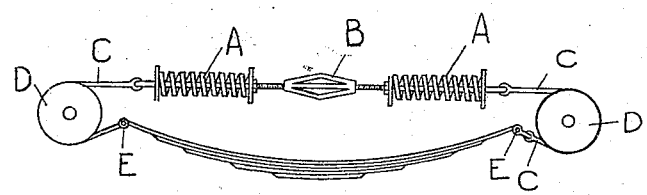
Figure 2:
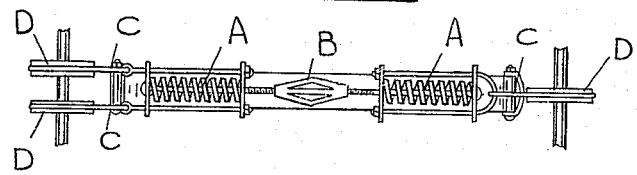
Figure 3:
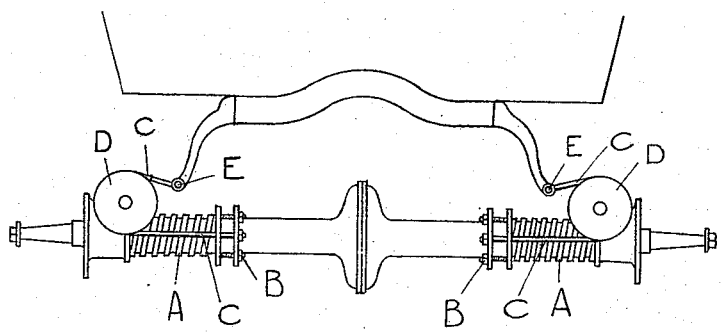
Figure 4:
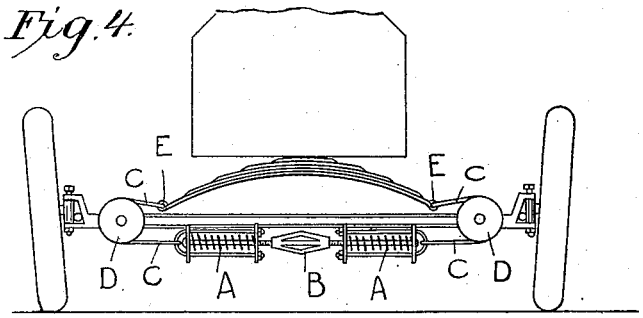
Figure 5:
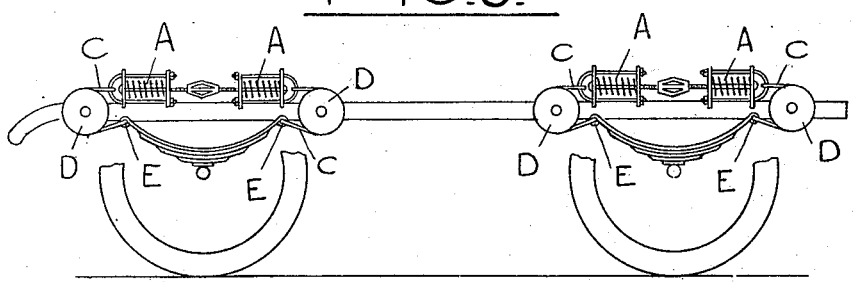

Figures 1 and 2 are side and plan views respectively of my shock absorber detached from any vehicle. Fig. 3 shows the application of my invention to the back of a vehicle of the type usually provided with a cross spring. This type of vehicle will require two shock absorbers one across the front and one across the back. This figure is less diagrammatic than the others and more nearly represents a practical application. Fig. 4 is a front view showing my shock absorber applied to the front of a vehicle of the same type, the cross spring being retained to form the brackets, and Fig. 5 is a side view showing my shock absorber applied to a vehicle where the front and rear axles have independent absorbers, the vehicle having four shock absorbers in all, two on each side.

The leaf spring shown in the figures other than Fig. 3 may be replaced by rigid brackets similar to those shown in Fig. 3.

Two, three or four of my shock absorbers will be required to each vehicle according to the general design and size of same, and it is evident that in the particular application of my shock absorbers to different makes of vehicles variations, such as may readily be made by any competent mechanic, will be required in the relative positioning and manner of attachment to the vehicle, also in the construction and strength of the springs.

In vehicles of the type in which the leaf spring has heretofore been usually attached to the body I mount the pulleys upon the axle. In vehicles of the type in which the leaf spring has heretofore been usually attached to the axle I mount the pulleys upon the main frame.

Referring now to the Figs 1 and 2 of the drawings, I have shown the spring device as comprising two spiral springs A A with a tension adjusting device B between them. The ends of the spring device are connected by short flexible connections C C passing around pulleys D D to points E E upon or projecting from the vehicle body the said pulleys being adapted to be mounted upon the frame or upon the axle of the vehicle. The flexible connections are preferably made of lengths of cable or of chain. The spring device may consist of a single adjustable spring in place of the two springs with the tension adjusting device between them.

Referring to the Figs. 3 to 5. The pulleys D D may be mounted upon the axle of the vehicle as in Figs. 3 and 4 or upon the frame as in Fig. 5 to hold them at the required distance apart. The points E E, whether at the ends of rigid brackets as in Fig. 3 or at the ends of leaf springs as shown in the other figures, will be attached to the body of the vehicle as shown in Figs. 3 and 4 when placed across the vehicle, and to the axles of the vehicle as shown in Fig. 5 when placed lengthwise of the vehicle. As shown in Fig. 3 the springs A A are mounted upon the axle casing the one end of each spring abutting against the collar just inside the wheel and the other end abutting against a double slidable sleeve or gland with adjusting set screws, the flexible connection being attached to the slidable sleeve so that the spring is compressed between the sleeve and the collar.

The effect of my improved shock absorbers, when in operation, is that the vertical movement of any one of the wheels of the vehicle is transmitted through the connections C C around the pulleys D D to the spring device A A, the movement being wholly or practically taken up in a horizontal distortion of the spring device instead of being transmitted to the body of the vehicle. By arranging the points of attachment of the flexible connections on the same side of the pulleys so that the portions of the said connections extend normally approximately parallel, when the said points of attachment move toward and from each other they vary the angle of the flexible connection and thereby vary the load on the spring device.

What I claim is—

1. An improved shock absorber for motor cars and other vehicles comprising pulleys so mounted upon the vehicle as to be maintained at a fixed distance apart, a spiral spring device suitably positioned relatively to the pulleys, and flexible connections extending from the ends of the spiral spring device passing around the pulleys and secured at points upon the vehicle located at the same side of the pulley as the point of attachment of the flexible connection to the spring device so that the portions of the flexible connections extend normally approximately parallel, whereby when the said points move toward and from each other they vary the angle of the flexible connection and thereby vary the load on the spring device.

2. An improved shock absorber for motor cars and other vehicles comprising a spiral spring device, pulleys attached to the axle of the vehicle, flexible connections from the ends of the spring device passing around said pulleys to points attached to the body of the vehicle and located inwardly of the pulleys.

3. An improved shock absorber for motor cars and other vehicles comprising bracket pieces attached to the vehicle body, spiral spring devices carried by the axle, pulleys attached to the axle exterior of the bracket pieces, and flexible connections between the bracket pieces and the spring device.

4. An improved shock absorber for motor cars and other vehicles comprising bracket pieces attached to the vehicle body, pulleys attached to the axles exterior of the bracket pieces, a spring device positioned between the pulleys, and connections between the ends of the spring device and the bracket pieces.

In testimony that I claim the foregoing as my invention I have signed my name in the presence of two subscribing witnesses this tenth day of June, 1915.

FRANCIS MAYFIELD BEST.

Witnesses:
ARTHUR GORE COLLISON,
LESLIE HERBERT BROADBENT.